Figure 1:
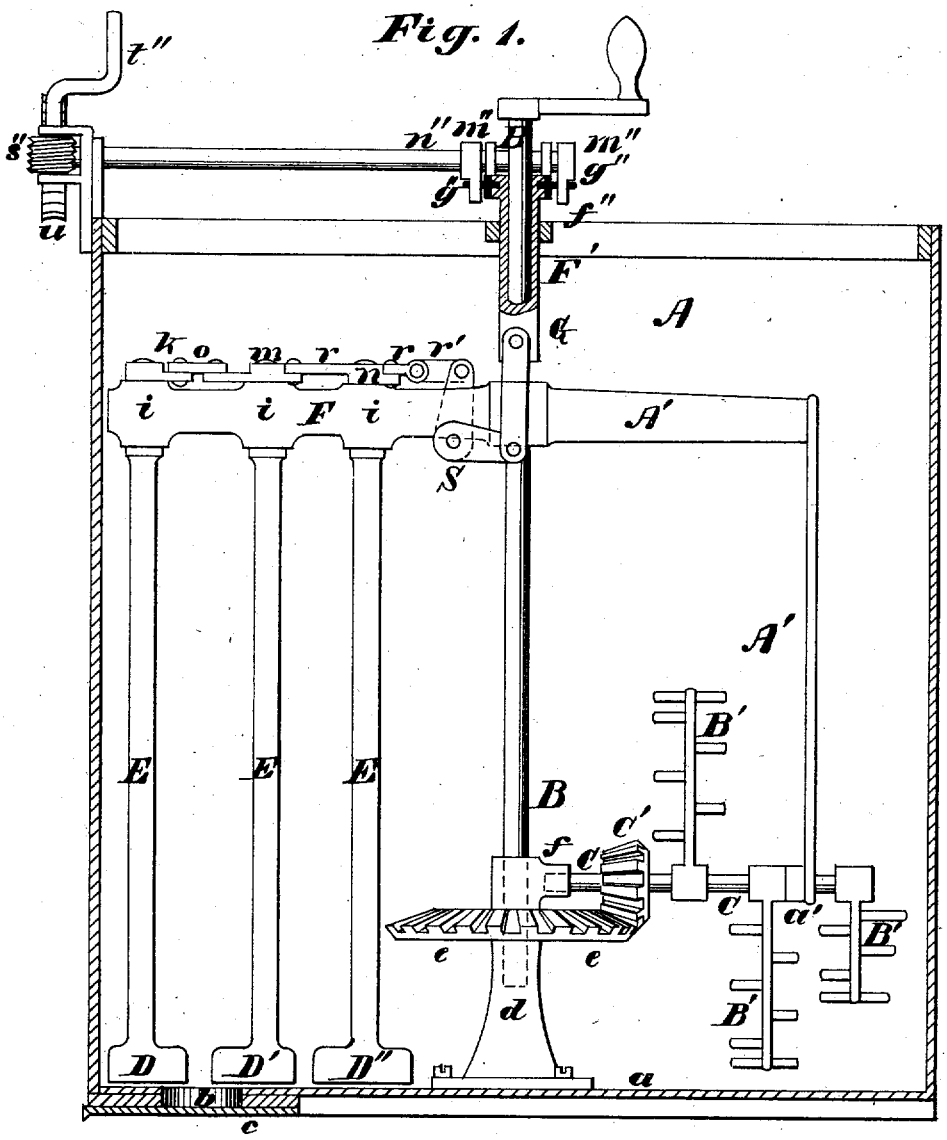

2 Sheets—Sheet 1.

C. STOLL.

Machine for Mashing and Mixing Brewers' Mash.

No. 9,080. Reissued Feb. 17, 1880.

Witnesses.
Chas. H. Doxat
H. F. Parker.

Inventor.
Charles Stoll
Per James A. Whitney
Attorney.

N. PETERS, PHOTO-LITHOGRAPHER, WASHINGTON, D. C.

C. STOLL.

Machine for Mashing and Mixing Brewers' Mash.

No. 9,080. Reissued Feb. 17, 1880.

Witnesses.

Chas. H. Doscat

H. P. Parker.

Inventor.

Charles Stoll per James A. Whitney

Attorney.

N. PETERS, PHOTO-LITHOGRAPHER, WASHINGTON, D. C.

UNITED STATES PATENT OFFICE.

CHARLES STOLL, OF BROOKLYN, E. D., NEW YORK.

MACHINE FOR MASHING AND MIXING BREWERS' MASH.

SPECIFICATION forming part of Reissued Letters Patent No. 9,080, dated February 17, 1880.

Original No. 217,830, dated July 22, 1879. Application for Reissue filed October 20, 1879.

*To all whom it may concern:*

Be it known that I, CHARLES STOLL, of Brooklyn, E. D., in the county of Kings and State of New York, have invented certain Improvements in Mashing-Machines and Mixers for Brewers' Use, of which the following is a specification.

This invention relates for the most part to that class of machines for mashing and mixing brewers' mash in which the mash is subjected to the combined action of revolving beaters and of shares which, in addition to a more or less mixing effect, act to throw the contents of the mash-tub in emptying the latter toward a suitably-arranged outlet-opening in the bottom of said tub.

As hitherto constructed the shares of such apparatus have been incapable of axial adjustment, and as a consequence have failed in their operation to reach the highest degree of utility, convenience in manipulation, or economy of power required.

My invention comprises a novel combination of a system of shares which, when in operation, have a circular movement around a vertical axis, and which are axially adjustable—in other words, adjustable to a greater or less angle, or none at all, to their lines of movement—and a tub constructed with an outlet-opening in its bottom, whereby the shares may be brought into any position desired, both as regards the avoidance of resistance to their movement when acting as stirrers and to their efficiency in sweeping the contents of the tub to and through the outlet-opening in emptying the tub.

The invention also comprises a novel combination of the aforesaid system of shares, mechanism for adjusting the same, the tub having an opening in its bottom, and a system of beaters upon a horizontal shaft, whereby the rapidity and thoroughness of the mixing operation, together with the easy discharge of the material from the tub, are very greatly promoted.

The invention also comprises certain other novel combinations of parts having for their immediate object the more easy and convenient carrying into practice of the principal features of the invention, as just hereinbefore set forth. The said combinations effectually provide for the adjustment of the shares to the positions most advantageous at different stages in the operation of the machine, and secure, as a consequence, its greatly-increased practical efficiency, convenience of management, and economy in the power required for its operation.

Figure 2:
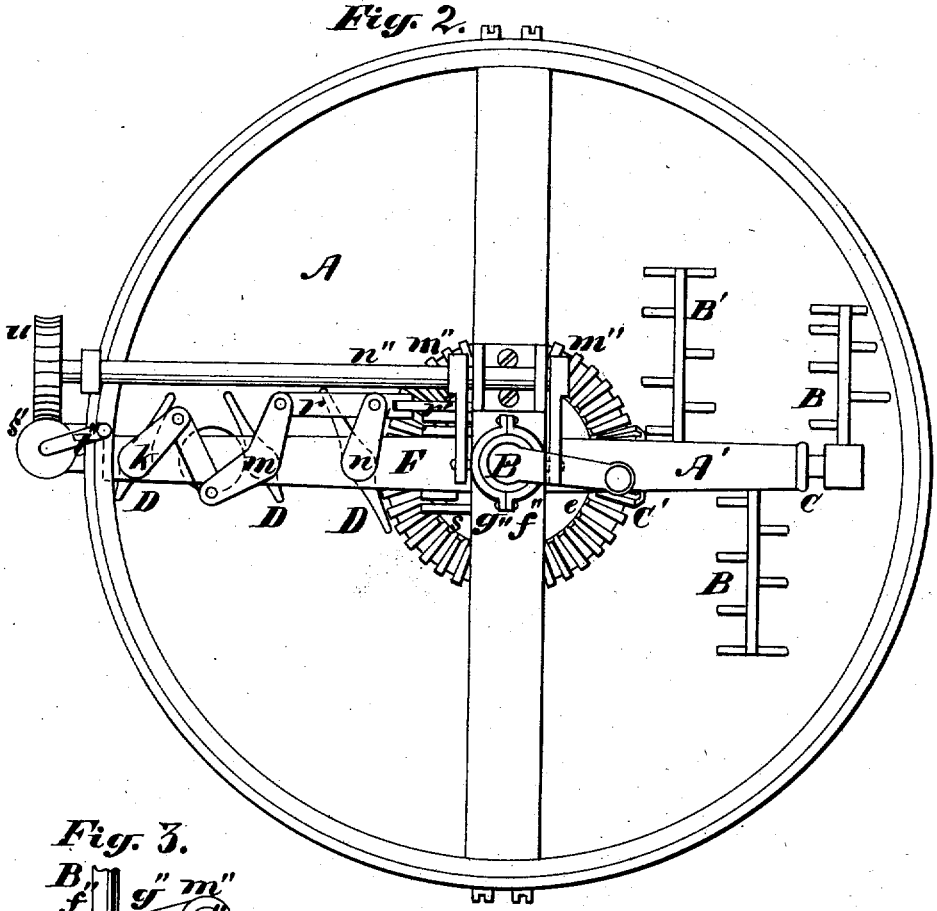
Figure 3:
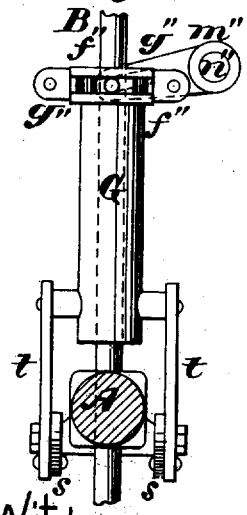
Figure 4:
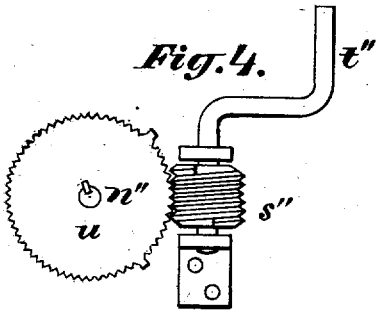

Figure 1 is a vertical sectional view, and Fig. 2 a plan view, of an apparatus embracing my said invention. Figs. 3 and 4 are detail views of certain portions thereof.

A is the mash-tub, of the usual cylindric and flat-bottomed form, or of any other suitable shape. In the bottom *a* of this tub is an opening, *b*, which, during the mashing and mixing operations, is closed by a suitable sliding plate, *c*, or by other appropriate means.

In the center of the bottom of the tub is a short hub or standard, *d*, surmounted by a fixed beveled gear, *e*. In the top of this hub is a step or bearing for the foot of a vertical shaft, B, which is supported above by a suitable bearing, and which forms the axial or operating shaft of the machine. Attached to the lower part of this axial shaft is a box, *f*, which receives one end of a horizontal shaft, C, the opposite end of which is sustained by a bearing, *a'*, provided in the depending arm of a bracket, A', attached to and carried by the axial shaft.

The shaft C is furnished with radial arms or beaters B', and has at its inner end a bevel-pinion, C', which gears into the beveled gear *e*, so that when the shaft C is whirled around in a horizontal plane by the rotation of the axial shaft a rapid rotary motion is communicated to the shaft C and to the beaters on said shaft C. The compound motion thus afforded to the beaters gives them a very efficient mixing action as they are rapidly swept around within the mash-tub. This particular mixing device, however, considered by itself, is not new, and, except in the combinations hereinafter stated, is not here claimed.

D D' D'' are shares, which may be simple flat plates set in vertical planes and each attached to the lower end of a vertical shank, E, which is capable of being turned or adjusted around its own axis in the adjustment of the shares, as hereinafter described, the upper end of which works through a socket, *i*, in a horizontal arm, F, attached to and extending laterally from the axial shaft B.

The shank of the share D has upon its upper extremity, above the arm F, a lever-arm, *k*, that of the share D′ a bell-crank, *m*, and that of the share D″ a lever-arm, *n*. The lever-arm *k* connects, by a link, *o*, with one end of the bell-crank *m*, and the opposite end of the latter connects, by a link, *r*, with the lever-arm *n*. To the end of the link *r* is also pivoted a secondary link, *r′*, the opposite end of which secondary link connects to the upper end of a vertical bell-crank, S, the lower end of which, by a vertical link, *t*, is connected with a sleeve, G, which is placed upon the upper portion of the axial shaft, and passes through the bearing F′, which supports said upper portion of said shaft. The sleeve G is capable of a vertical movement, and this movement transmitted through the system of connecting devices just described operates to change the position of the shares in vertical planes and at angles to the circular path of their rotation. For example, when the sleeve is elevated, a turning movement is given to the shanks of the shares to bring the latter as near as may be longitudinal with the line of rotation. When, on the other hand, the sleeve is depressed the shares are turned into positions at a greater or less angle to their line of travel. It is to be observed, however, that the share D will be turned in a direction opposite to that of the shares D′ D″, for the reason that its connection is with that end of the bell-crank *m* opposite that in connection with which the shares D D′ are operated.

During the operation of mashing and mixing the shares may be brought as near as may be coincident longitudinally with the direction of their line of travel, and in such case the shares serve merely as stirrers to assist in a greater or less degree the action of the special stirring mechanism hereinbefore described. In this position the shares, moving nearly or quite edgewise, meet with very little resistance from the material through which they pass, and by this means require the expenditure of very little power over and above that required for the operation of the beaters. When, however, it is desired to empty the mash-tub, the shares are brought to their inclined positions as follows: the share D in such manner as to throw the mash or material inward from the circumference of the mash-tub, and the others, D′ D″, so as to throw said material outward from the center of the tub. As a consequence, the rotation of the shares serves to continually plow the material to that part of the bottom of the mash-tub swept over by the space between the share D and share D′, in which said portion of the bottom of the tub is provided the outlet *c*, opened to permit the outflow or passage of the material from the tub.

The plowing or feeding action of the shares, combined with the tendency of the stirring mechanism to carry the material around the tub, causes the said material to pass rapidly toward and outward through the aforesaid outlet, thereby rapidly emptying the tub, with no other expenditure than the mere cost of rotating the internal mechanism, and in much less time than it could be accomplished by manual labor.

In order to easily give the vertical movement to the sleeve G, as and for the purpose hereinbefore stated, there is provided upon the upper extremity of said sleeve a disk, *f″*, in the broad circumference of which is provided a groove extending entirely around the same. Upon said circumference is placed a yoke, *g″*, provided with internal studs, which fit into the groove of the disk, so that a vertical movement given to the yoke will be transmitted to the sleeve without preventing the latter from rotating with the shaft B.

The yoke is pivoted to the outer extremities of two parallel arms, *m″*, on one end of a rock-shaft, *n″*, the opposite end of which has a worm-wheel, *u*, to which slow but powerful movement may be given by a worm, *s″*, actuated by a crank, *t″*.

Rotation of the worm in one direction or the other, as the case may require, insures the requisite vertical adjustment of the sleeve to adjust the shares to the desired postion.

It may be observed that the shares D′ D″, &c., may be increased in number to any desired extent, and that the number of beaters on the shaft C may in like manner be increased to any requisite degree.

What I claim as my invention is—

1. The system of shares capable of simultaneous axial adjustment, in combination with a mash-tub having an outlet-opening, substantially as and for the purpose herein set forth.

2. The combination of the axial shaft B, sleeve G, bell-cranks *m* S, and lever-arms *k n* with the shanks E of the system of shares, substantially as and for the purpose herein set forth.

3. In mashing and mixing apparatus, the combination of the following elements, viz: the system of rotary beaters on a horizontal shaft carried by and rotated from the axial shaft, the system of shares for forcing the material from the mash-tub through an opening in the bottom of the said tub, and bell-cranks, levers, and sleeve for axially adjusting the shares, substantially as and for the purpose herein set forth.

CHARLES STOLL.

Witnesses:
JAMES A. WHITNEY,
HENRY F. PARKER.